May 20, 1952  C. C. COONS  2,597,779
REFRIGERATING APPARATUS.
Filed Nov. 18, 1948  2 SHEETS—SHEET 1
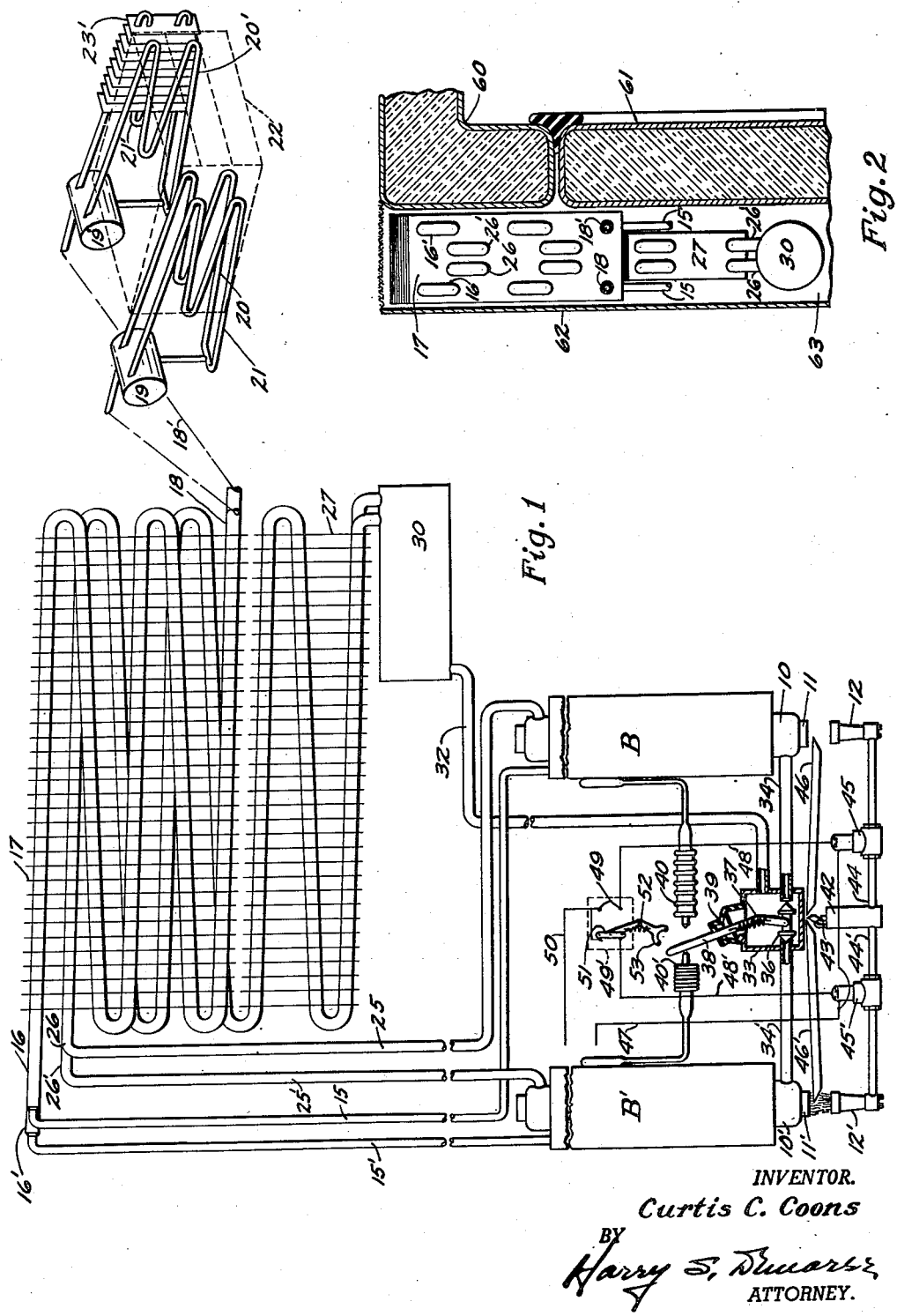
INVENTOR.
Curtis C. Coons
BY
Harry S. Dumars
ATTORNEY.

Patented May 20, 1952

2,597,779

UNITED STATES PATENT OFFICE 2,597,779

REFRIGERATING APPARATUS

Curtis C. Coons, North Canton, Ohio, assignor to The Hoover Company, North Canton, Ohio, a corporation of Ohio Application November 18, 1948, Serial No. 60,687

5 Claims. (Cl. 62—5)

1

The present invention relates to the art of refrigeration and more particularly to a novel cooling system especially adapted for use with intermittent absorption refrigerating apparatuses.

It is characteristic of intermittent absorption refrigerating apparatuses that the generator-absorber is at a temperature far above an absorbing temperature at the end of a generating period. No useful function can be served by such a generator-absorber until it and its contents are cooled sufficiently to initiate absorption and the time required to effect this cooling is a total loss insofar as any useful refrigerating effect is concerned. The high temperature of the generator-absorber at the beginning of an absorbing period of operation throws an enormous load upon the cooling system if the generator-absorber is to be cooled in any reasonable period of time. The foregoing imposes two burdens upon machines of this type because the initial heat load per unit of time, if the generator-absorber is to be cooled with reasonable promptness, is enormously greater than the heat load per unit of time after active absorption begins and the initial heat rejecting period is necessary but worthless in the total cycle of operation.

It is an object of the present invention to shorten the period required to dissipate the initial high heat rejecting load at the beginning of an absorption period of operation of a generator absorber without increasing the total heat rejecting area of the apparatus.

It is a further object of the present invention to provide a cooling system for an intermittent refrigerating system in which the initial high heat rejecting load on the secondary cooling system is in part thrown upon heat rejecting areas primarily designed for satisfying the needs of other portions of the apparatus but which are inactive during the period when the high heat rejecting load must be met.

Other objects and advantages of the invention will become apparent as the description proceeds when taken in connection with the accompanying drawing in which:

Figure 1 is a schematic representation of the refrigerating system embodying the present invention;

Figure 2 is a fragmentary view showing the manner in which certain portions of the apparatus are related to a refrigerator cabinet.

2

Figure 3:
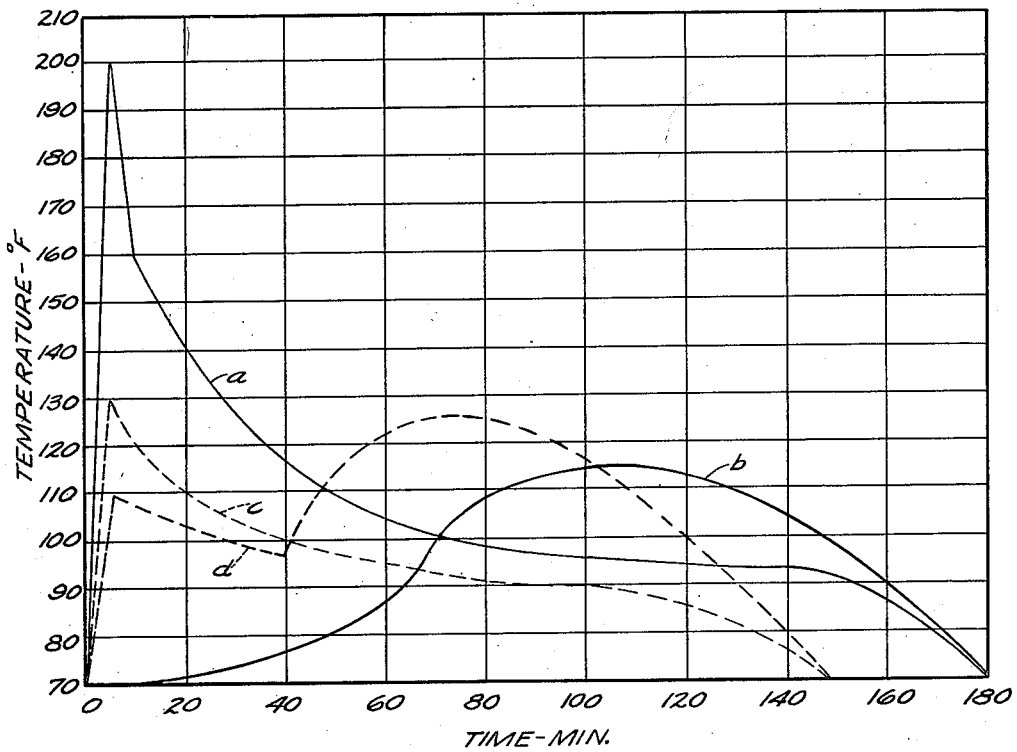
Figure 3 is a chart contrasting conventional practice with the results of the present invention.

Referring now to the drawing and first to Figure 1 thereof, there is shown a dual intermittent absorption refrigerating system consisting of two refrigerating apparatuses which are identical. Only the right hand generator absorber as viewed in Figure 1 and its associated apparatus will be described. The corresponding left hand portion of the apparatus will be given the same reference characters distinguished by the addition of a prime.

The apparatus comprises a generator absorber B which houses a suitable absorbent for the refrigerant such as strontium chloride, calcium chloride or liquid absorbent such as water or the like. The central portion of the generator absorber B is pierced by an annular cooling jacket 10 which in turn surrounds a centrally located products of combustion heating flue 11. The generator absorber is adapted to be heated by any suitable means such as a combustible fuel burner 12 positioned to discharge its products of combustion into the central flue 11. When heat is applied to the generator absorber B, refrigerant, such as ammonia, is evolved from the absorbent therein contained and the vapor flows through a conduit 15 into a condenser 16 wherein it is liquefied by passing in heat exchange with atmospheric air flowing over the fins 17 which are pierced by the condenser tube 16. The liquid refrigerant then flows through a conduit 18 to a liquid receiver 19 to which are connected the inner and outer evaporation conduits 20 and 21 where the useful refrigerating effect is produced. As illustrated the inner evaporator conduits 20—20' are positioned to refrigerate a freezing housing for supporting ice trays and the like indicated in dotted lines at 22. The outer conduits 21—21' are provided with cooling fins 23 (only the fins 23' are shown for clarity in illustration) which are adapted to cool the air within a food storage chamber.

As shown more clearly in Figure 2 it will be noted that the fins 17 are common to the condensing conduits or tubes 16—16'. This interposes no difficulty in the operation of the apparatus as the generator absorbers B and B' operate in out of phase relationship with each other so that when one is generating and imposing a condensing load on its associated condenser tube, the other generator absorber is absorbing and hence throws no heat dissipating load upon this condensing system.

The cooling jacket 10 for the generator absorber B is associated with the circulatory system for a secondary vaporizable cooling medium such as methyl chloride. Liquefied secondary coolant supplied to the jacket 10 is vaporized therein during the absorbing period of operation of the apparatus to remove the heat of absorption from the contents of the generator absorber B. The vapor so produced flows from the upper portion of the jacket through a conduit 25 into a condenser tube 26 which also pierces the fins 17 common to the primary condensers 16—16'. The condenser tube 26 however extends beyond the fins 17 and pierces and additional set of cooling fins 27 positioned below the fins 17. The condensate formed in the conduit 26 discharges therefrom into a reservoir 30. As shown more clearly in Figure 2 it will be seen that the secondary condensing conduit 26' also pierces the cooling fins 17 and 27 in a manner similar to the conduit 26.

The condensate discharged to the reservoir 30 is conveyed through a conduit 32 into a control valve chamber 33. Conduits 34 and 34' are arranged to convey cooling medium from the chamber 33 to the jackets 10—10' respectively. A double valve plug 36 mounted in the chamber 33 is arranged to open one or the other of the inlet ends of the conduit 34 depending upon a control mechanism to be described. The plug 36 is operated by a snap acting mechanism 37 provided with a long actuating arm 38 extending outside the chamber 33 through a sealing flexible boot 39.

The arm 38 is positioned to be operated by thermostats 40—40' in opposite directions. The thermostat 40 responds to the external temperature of the generator-absorber B and the thermostat 40' to the external temperature of the generator-absorber B'. In the position of the apparatus shown in the drawing, the thermostat 40 has just expanded to terminate a generating period of operation of the generator-absorber B and has actuated the arm 38 to the left as viewed in Figure 1 which operates the snap acting mechanism to shift the valve plug to the position shown in which cooling medium is supplied to the jacket 10 and the supply to the jacket 10' is interrupted.

Fuel for the burners 12—12' is supplied from a suitable source to a pilot housing 42 supporting an ignition pilot 43. Gas is conveyed to the burner 12 through conduit 44 which includes a solenoid control valve 45. Flash tubes 46—46' extend from an area slightly above the top of the burners to the ignition pilot 43 in order to ignite the burners automatically whenever fuel is supplied thereto. The solenoid valves 45—45' are each connected to the line conductor 47. The solenoid valve 45 is connected by means of a conductor 48 to one of a pair of spaced switch contacts 49. The other contact 49 is connected to the other line conductor 50. Similarly the solenoid 45' is connected by the conductor 48' to spaced contacts 49'. The contacts 49 and 49' are each adapted to be electrically connected by a movable bridge contact 51 which is carried by and operated by a snap acting mechanism 52. The snap acting mechanism 52 includes an actuating yoke portion 53 positioned in the path of movement of arm 38 so that the switch mechanism is operated to deenergize one solenoid valve and to energize another whenever the arm 38 is actuated by thermostats 40—40'. In the position shown the switch has just been operated to bridge the contacts 49' to energize the solenoid valve 45' which supplies fuel to the burner 12'. This also has deenergized the solenoid 45 which has closed automatically and discontinued the supply of fuel to the burner 12.

Figure 2 shows the arrangement of the apparatus with respect to a cabinet construction. There is shown the upper rear corner of an insulated refrigerator cabinet 60 which is provided with a conventional insulated removable rear panel 61 to permit the evaporators to be inserted into the interior thereof. A panel 62 spaced from the rear wall of the insulated cabinet structure provides an air flue 63 which houses the heat rejecting portions of the apparatus. It will be seen from Figure 2 that the fins 17 are pierced by both primary and secondary condenser systems whereas the fins 27 are pierced only by the lower portions of the secondary condenser conduits 26—26'. In this apparatus the evaporating system will be placed within the storage compartment defined by the cabinet 60 and the panel 61.

The operation of the apparatus can best be understood by reference to Figure 3 which is a chart contrasting the performance of a conventional apparatus with the present invention. In the chart, time in minutes is plotted against temperature in degrees Fahrenheit. The solid line marked "$a$" is the time temperature curve of a secondary condenser tube in a convention apparatus in which the primary and secondary condensers are distinct during an absorbing period of operation of the apparatus. The solid line marked "$b$" is the time temperature curve of a primary condenser of a conventional system in which the primary and secondary condensers are entirely distinct from each other. The dotted line $c$ is the time temperature curve of the secondary condenser of the apparatus of the present invention and the dotted line $d$ is the time temperature curve of the primary condenser tube of the present invention.

Referring first to the curves $a$ and $b$ the extremely heavy initial heating load upon the secondary system is shown by the initial enormous rise in temperature in the line $a$ and its gradual drop to room temperature during one complete absorbing period of operation. No absorption of any description occurs until approximately the break point in the curve $a$ at about 160° F. after it has passed its peak. Up to this point the secondary coolant is rejecting heat from the generator-absorber and cooling the same to the point where the absorbent is in equilibrium with the vapor pressure of the refrigerant contacting it. From this break point until the curve approaches 100° F. the secondary system is rejecting considerable sensible heat from the generator-absorber structure and its contents and a comparatively small heat of absorption which represents the small amount of vapor absorbed merely to reduce the vapor pressure within the primary system to the point at which evolution of vapor in the evaporator will begin. From approximately the point where this curve crosses the 100° F. line to the point at which it breaks and begins to drop off sharply represents the period during which the secondary system is primarily rejecting heat of absorption. The break point represents substantially the point at which the liquid refrigerant in the primary system is exhausted and the system is then merely reducing the pressure in the primary system. The line $b$ shows a gradual increase in temperature of the primary condenser tube which represents an increase in vapor pressure within the primary system due to the heat applied to the generator-absorber until the pressure builds up to the point at which condensation begins, in this instance substantially at 100° F. From this point on the temperature of the tube increases until it reaches a peak which is the point at which the maximum rate of evolution of vapor from the absorbent has been reached after which the temperature drops as the rate of vapor evolution drops substantially to zero. It will be seen from the foregoing that there is a period of some seventy minutes from the time heat is initially applied to the apparatus until effective condensation begins and substantially the same period of time elapses before effective absorption begins in the other system.

The curves c and d show a sharp initial rise in the temperature of both primary and secondary condenser tubes. The initial rise in the secondary condenser tube is caused by the rapid circulation in the secondary system and flash evolution of vapor immediately liquid coolant strikes the hot generator absorber. This vapor flows through the secondary condensing tube such as 26—26' rejecting heat through the fins 17 and 27 to cooling air. Because of the fact that the secondary condenser pierces the fins which serve the primary condenser the temperature of these tubes also rises sharply and then drops off after the peak point is reached, however, the effective heat rejecting area on the secondary system at this time is the total heat rejecting area provided for primary and secondary systems. As will be seen from the curves a and b, this does not interfere with the primary condenser at this time because the same is not called upon to dissipate any significant amount of heat. After the peaks are reached both curves c and d show a drooping characteristic until the curve d takes a reverse turn, about 40 minutes after switch-over, and rises which is the point at which active condensation begins in the primary condenser tube, however, at this point, as shown by the curve c, the major initial heat rejecting load on the primary system has been dissipated and the secondary system is then called upon only to dissipate the comparatively small reaction heat as effective refrigeration production begins. As the temperature of the primary condenser suddenly increases due to the picking up of a condensation load, the curve d rises rapidly to a peak and then drops off having a general shape similar to curve b above mentioned but terminating in a shorter period of time. Similarly the curve c reaches the 70° line in a lesser period of time than it was required for the curve a previously described. This shortening of the total period is a gain which is taken up by shortening up the period of time required for the secondary system to reduce the temperature of the generator absorber to approximately 100° F. at which point the production of effective refrigeration begins hence the actual effective refrigeration period for the curves c and d is substantially the same as for the curves a and b. It is only the dead period between switch over and the production of effective refrigeration which is shortened. This will require a slightly greater rate of heat input to the generating generator absorber in order to shorten up the generating period correspondingly. This however is a simple matter and offers no problem as the heating rate is customarily adjusted to make the generating period just long enough for the associated generator absorber to complete an absorbing period of operation.

As soon as the temperature of the primary condenser increases above that of the secondary condenser all heat rejected from the fins 17 is heat of condensation in the primary system and the secondary system vapor flows through the conduit 26 without condensing until it reaches those portions of the conduit 26 which pierce the fins 27. Since these cooling fins are not in heat exchange relation with the primary condenser they then carry the heat rejecting load of the secondary system.

The curves a and b roughly represent the magnitudes of the primary and secondary heat rejecting loads. From the curve a it is apparent, for any time period of operation of the apparatus, that the secondary heat rejecting load begins with a maximum value, drops to a median value and then continues roughly at the median value until effective absorption ceases. From the curve b it is apparent that the primary heat rejecting load starts at a zero value and slowly builds up to the point at which condensation begins after which this load rises to a peak and then decreases until generation is completed. The initial high heat rejecting load of the secondary system is dissipated at approximately the time at which the primary system assumes a significant heat rejecting load. The present invention makes full use of this feature to effect a reduction in heat rejection area and to shorten the total operating period of the apparatus.

From the foregoing it is apparent that the present invention provides a means by which substantially all the heat rejecting area of the system is made available to reject heat from the secondary system during the period when the heat rejecting load of the secondary system is at a peak which coincides with the period during which neither primary system is imposing a heat rejecting load on the apparatus. On the other hand when the peak heat rejecting load on the secondary system is passed that heat rejecting load is then shifted from the heat rejecting area common to all parts of the system to a separate comparatively small heat rejecting area which is adequate to carry the magnitude of the load imposed upon the apparatus at that time whereas the common heat rejecting area then satisfies solely the primary heat rejecting load of the system. This arrangement results in a much more rapid dissipation of the initial high heat load and very effectively shortens up the total absorbing period of operation of the apparatus which results in more rapid and more efficient operation of the entire system.

The foregoing has assumed that the conventional system and the system described in this application each have the same total amount of heat rejecting area. If the time period of operation shown for the conventional system represented by the curves a and b is acceptable, the present invention permits the same performance can be secured from the apparatus with a considerable reduction in total heat rejecting area which results in appreciable construction economy.

While I have illustrated and described the invention in considerable detail, it is to be understood that various changes may be made in the arrangement, proportion and construction of parts without departing from the spirit of the invention or the scope of the appended claims.

I claim:

1. Refrigerating apparatus comprising a cabinet structure including a refrigerating chamber and a cooling air flue arranged exteriorly of said chamber, a refrigerating system associated with said cabinet structure including a generator-absorber, a condenser in said flue and an evaporator for refrigerating said chamber, a cooling system for cooling said generator-absorber including a heat rejecting element in said air flue, a first set of cooling fins in said air flue in heat exchange with said condenser and a part of said element and a second set of cooling fins in said air flue in heat exchange with another part of said element.

2. Refrigerating apparatus comprising a cabinet structure including a refrigerating chamber and a cooling air flue arranged exteriorly of said chamber, a pair of intermittent absorption refrigerating systems associated with said cabinet structure, each of said systems including a generator-absorber, a condenser in said flue and an evaporator for refrigerating said chamber, a cooling system for cooling said generator-absorbers including a heat transfer structure, means for heating said generator-absorbers, control means for operating said heating means and said cooling means to heat and cool each of said generator-absorbers alternately in out of phase relation with each other, a first cooling fin structure in said flue arranged to dissipate heat from said condensers and a part of said heat transfer structure, and a second cooling fin structure in said flue arranged to dissipate heat from another part of said heat transfer structure.

3. Intermittent absorption refrigerating apparatus comprising a generator-absorber, a condenser and an evaporator connected in circuit, a vaporization condensation cooling system for cooling said generator-absorber having vaporizing means in heat exchange with said generator-absorber, condensing means removed from said generator-absorbers, means for conveying vapor from said vaporizing means to said condensing means and means for conveying condensate formed in said condensing means to said vaporizing means; a first heat dissipating means in heat exchange relation to said condenser and the portions of said condensing means first to receive vapor from said vaporizing means, and a second heat dissipating means in heat exchange relation with the portions of said condensing means not in heat exchange with said first heat dissipating means.

4. Absorption refrigerating apparatus comprising a pair of absorption refrigerating systems each including a generator-absorber, a condenser and an evaporator connected in circuit, means for heating each of said generator-absorbers, means for cooling said generator-absorbers, control means for actuating said heating means and said cooling means to heat and cool each of said generator-absorbers alternately and in out of phase relation to each other; said cooling means comprising a vaporization condensation cooling system for cooling said generator-absorbers having vaporizing means in heat exchange with said generator-absorbers, condensing means removed from said generator-absorbers, means for conveying vapor from said vaporizing means to said condensing means and means for conveying condensate formed in said condensing means to said vaporizing means; a first heat dissipating means in heat exchange relation to said condensers and the portions of said condensing means first to receive vapor from said vaporizing means, and a second heat dissipating means in heat exchange relation with the portions of said condensing means not in heat exchange with said first heat dissipating means.

5. Intermittent absorption refrigerating apparatus comprising a generator-absorber, a refrigerant condenser and an evaporator connected in circuit; a vaporization condensation cooling system for cooling said generator-absorber having cooling medium vaporizing means in heat exchange with said generator-absorber and first and second cooling medium condensers connected to receive cooling medium vapor from said vaporizing means serially in the order named; said refrigerant condenser and said first cooling medium condenser being positioned adjacent each other, a first set of heat dissipating cooling fins in heat transfer relation with said first cooling medium condenser and said refrigerant condenser, said second cooling medium condenser being spaced from said first cooling medium condenser and said refrigerant condenser, and a second set of heat dissipating fins in heat exchange relation with said second cooling medium condenser.

CURTIS C. COONS.

REFERENCES CITED

The following references are of record in the file of this patent:

UNITED STATES PATENTS

| Number | Name | Date |
| --- | --- | --- |
| 1,854,778 | Boving | Apr. 19, 1932 |
| 1,908,413 | Elving | May 9, 1933 |
| 2,401,233 | Kleen | May 28, 1946 |
| 2,438,105 | Kleen | Mar. 23, 1948 |